United States Patent
Mizell et al.

(10) Patent No.: US 6,453,175 B2
(45) Date of Patent: Sep. 17, 2002

(54) MULTI-FUNCTION CODING ELEMENT AND AN ASSOCIATED TELECOMMUNICATIONS NETWORK

(75) Inventors: Jerry L. Mizell, Plano; David Lauson, Allen; Kent Fisher, Dallas; Larry D. Lewis, Garland, all of TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/808,479

(22) Filed: Mar. 14, 2001

Related U.S. Application Data

(63) Continuation of application No. 09/100,277, filed on Jun. 19, 1998.

(51) Int. Cl.[7] .................................................. H04B 1/38
(52) U.S. Cl. .................... 455/560; 455/556; 455/557; 375/222
(58) Field of Search ................................ 455/556, 557, 455/561, 560; 375/222; 379/93.09, 93.15

(56) References Cited

U.S. PATENT DOCUMENTS

| | | | |
|---|---|---|---|
| 5,590,406 A | 12/1996 | Bayley et al. | 455/557 |
| 5,797,102 A | 8/1998 | Hallikainen et al. | 455/557 |
| 5,864,763 A | 1/1999 | Leung et al. | 455/557 |

*Primary Examiner*—Lee Nguyen
(74) *Attorney, Agent, or Firm*—Haynes and Boone, LLP

(57) ABSTRACT

A wireless telecommunications network includes a base station controller which includes a call control resource manager and a multi-function coding element embodied within a DSP and comprised of first, second and third coding resources, each embodied as a software module, for respectively performing D/A and A/D on voice, facsimile and data messages. When transferring messages from a mobile terminal to an MSC via the base station controller, the mobile terminal first informs the base station controller whether the message is a voice, facsimile or data message. The mobile terminal then transfers the message to the call control resource manager residing within the base station controller. Based upon the indicated message type, the call control resource manager selects, from the first, second and third coding resources, a resource for performing a D/A conversion of the message received from the mobile terminal. After the selected resource performs the D/A conversion of the received message, the call control resource manager transfers the converted message to the MSC. Conversely, when transferring messages from the MSC to a selected mobile terminal via the base station controller, the MSC informs the base station controller whether the message is a voice, facsimile or data message. The MSC then transfers the message to the call control resource manager. Based upon the indicated message type, the call control resource manager selects one of the first, second and third coding resources to perform an A/D conversion of the received message. The call control resource manager will then transfer the converted message to the selected mobile terminal.

18 Claims, 1 Drawing Sheet

MULTI-FUNCTION CODING ELEMENT AND AN ASSOCIATED TELECOMMUNICATIONS NETWORK

This application is a Continuation of U.S. Ser. No. 09/100,277, filed Jun. 19, 1998.

TECHNICAL FIELD

The invention relates generally to telecommunication networks and, more particularly, to a multi-function coding element which performs voice, fax and data coding and is suitable for use in an associated telecommunications network

BACKGROUND OF THE INVENTION

In FIG. 1, the reference numeral 10 designates a conventional telecommunications network 10. As illustrated herein, the telecommunications network 10 includes a wireless system, for example, a cellular network and a wireline system, for example, the public switched telephone network ("PSTN"). The wireless system of the telecommunications network 10 further includes a mobile terminal. As illustrated herein, the mobile terminal 12 is a voice/fax/data terminal capable of operating in first, second and third modes in which voice, facsimile and data messages may be respectively transmitted or received.

The wireless system of the telecommunications network 10 also includes a base station 13 to which the mobile terminal 12 is coupled by an airlink. The base station 13 includes a base station controller 14 configured to transmit voice, fax and data messages to, and receive voice, fax and data messages from, the mobile terminal 12. While the wireless system illustrated in FIG. 1 shows a sole base station 13, it should be clearly understood that wireless systems typically include plural base stations, each having a base station controller incorporated therein. The base station controller 14 includes a voice coding ("vocoder") element 16 which performs digital-to-analog ("D/A") conversions on packets of digital voice data to produce analog voice tones. The vocoder element 16 also performs analog-to-digital ("A/D") conversions on analog voice tones to produce packets of digital voice data. More specifically, when set to operate in voice mode, the mobile terminal 12 will first advise the base station controller 12 to prepare to receive a voice message. The mobile terminal 12 will then transmit packets of digital voice data to the base station controller 34. There, the vocoder element 16 converts the received packets of digital voice data into analog voice tones for transmission to a mobile switching center ("MSC") 20 coupled thereto. The vocoder element 16 may be embodied within a digital signal processor ("DSP") which performs the D/A and A/D conversions of digital voice data and analog voice tones in accordance with respective sequences of instructions maintained thereby.

The MSC 20 directs the received analog voice tones to its destination which, for example, may be a second wireless terminal (not shown) coupled to the MSC 20, a wireless terminal coupled to a second MSC (also not shown), or, as illustrated herein, to a wireline terminal 26 located within the PSTN and coupled to the MSC 20 by an interexchange carrier (or "IXC") 22 and a local exchange carrier (or "LEC") 24. As illustrated herein, the wireline terminal 26, like the mobile terminal 12, is a multi-mode terminal configured to transmit and receive voice, fax and data messages. Furthermore, while the wireline terminal 26 is shown as the destination of the voice signal originating at the mobile terminal 12, it should be further understood that the analog voice signal may be directed via other IXCs (not shown) and LECs (also not shown) of the PSTN to any of the multitude of wireline terminals included as part of the PSTN.

When set to operate in fax or data mode, the mobile terminal 12 will advise the base station controller 14 to prepare to receive a fax or data message. The mobile terminal 12 will then transmit either a digital facsimile message or a digital data message to the base station controller 14. In turn, the base station controller 14 transfers the received digital fax or digital data message to an interworking function ("IWF") 18 which is coupled to the base station controller 14 and the MSC 20 and may be embodied as a DSP. If the IWF 18 receives packets of digital fax data from the base station controller 14, the IWF 18 converts the received digital fax data into analog modem tones. If, however, the IWF 18 receives a stream of digital data from the base station controller 14, the IWF 18 converts the received stream of digital data into an analog stream of digital data. The IWF 18 then passes the converted analog modem tones or analog data stream on to the MSC 20 where the message is handled in the manner previously described.

Voice, fax and data messages originating elsewhere on the telecommunications network 10 and having, as its destination, the mobile terminal 12, are handled in a reverse manner. Specifically, upon receiving analog voice tones destined for the mobile terminal 12 or other mobile terminal coupled to the base station controller 14, the MSC 20 will transmit the analog voice tones to the base station controller 14 where the vocoder element 16 will convert the analog voice tones signal into digital form. The resultant digital voice data produced thereby is then forwarded by the base station controller 14 to the mobile terminal 12. Conversely, when the MSC 20 receives analog modem tones or an analog data stream which originated elsewhere on the telecommunications network 10 and has, as its destination, the mobile terminal 12, the MSC 20 transfers the receive analog modem tones or analog data stream to the IWF 18 for conversion into digital format. After converting the received information into digital format, the IWF 18 transmits the resultant digital signal to the mobile terminal 12 via the base station controller 14

SUMMARY OF THE INVENTION

In one embodiment, the present invention is directed to a base station controller which includes a call control resource manager, a first coding resource and a second coding resource. The call control resource manager controls exchanges of messages between at least one mobile terminal and a mobile switching center ("MSC"). The first coding resource performs digital-to-analog ("D/A") and analog-to-digital ("A/D") conversions for a first message type while the second coding resource performs D/A and A/D conversions for a second message type. In one aspect thereof, the base station controller may also include a third coding resource which performs D/A and A/D conversions for a third message type and, in a further aspect thereof, the first, second and third message types may be voice, facsimile and data, respectively. The coding resources may be embodied as software modules which reside on a multi-function coding element, which itself may be embodied as a digital signal processor.

In still further aspects of this embodiment, as well as in other embodiments thereof, the call control resource manager may receive digital messages from the mobile terminal, determine the message type for that digital message, call a selected one of the coding resources to perform a D/A conversion on the message and transmit the converted analog message to the MSC. The call control resource manager may also receive analog messages from the MSC, determine the message type for that analog message, call a selected one of the coding resources to perform an A/D conversion on the message and transmit the converted digital message to a selected mobile terminal.

In another embodiment, the present invention is directed to a telecommunications network which includes first and second mobile terminals, each configured for transmission and receipt of digital messages in at least one of voice, facsimile and data modes, a base station controller coupled to the first and second mobile terminals by respective airlinks and an MSC configured for transmitting analog messages to, and receiving analog messages from, the base station controller in each of the voice, facsimile and data modes. The base station controller includes a multi-function coding element which converts digital voice messages into analog voice messages, analog voice messages into digital voice messages, digital facsimile messages into analog facsimile messages, analog facsimile messages into digital facsimile messages, digital data messages into analog data messages and analog data messages into digital data messages. The multi-function coding element may be comprised of plural software modules, each for performing the above-listed conversions for a particular type of message while the base station controller may include a call control resource module which controls transmissions of messages between the first mobile terminal and the MSC, transmissions of messages between the second mobile terminal and the MSC and calls to the first, second and third software modules to perform conversions on voice, facsimile and data messages, respectively.

In another embodiment, the present invention is directed to a method for transferring a message from a mobile terminal to an MSC via a base station controller. In accordance with this embodiment of the invention, the mobile terminal first informs the base station controller of a message type for the message. After informing the base station controller of the message type, the mobile terminal transfers the message to a call control resource manager residing within the base station controller. Based upon the message type of the received message, the call control resource manager selects, from at least two resources residing within the base station controller, a resource for performing a D/A conversion of the message received from the mobile terminal. After the selected resource performs the D/A conversion of the received message, the call control resource manager transfers the converted message to the MSC. In related aspects of this embodiment, a first resource is selected for D/A conversions of voice messages, a second resource is selected for D/A conversions of facsimile messages and a third resource is selected for D/A conversions of data messages.

In still another embodiment, the present invention is directed to a method for transferring a message from an MSC to a mobile terminal via a base station controller. In accordance with this embodiment of the invention, the MSC first informs the base station controller of a message type for the message. After informing the base station controller of the message type, the MSC transfers the message to a call control resource manager residing within the base station controller. Based upon the message type of the received message, the call control resource manager selects, from at least two resources residing within the base station controller, a resource for performing an A/D conversion of the message received from the mobile terminal. After the selected resource performs the A/D conversion of the received message, the call control resource manager transfers the converted message to the mobile terminal. In related aspects of this embodiment, a first resource is selected for A/D conversions of voice messages, a second resource is selected for A/D conversions of facsimile messages and a third resource is selected for A/D conversions of data messages.

DESCRIPTION OF A PREFERRED EMBODIMENT

Figure 1:
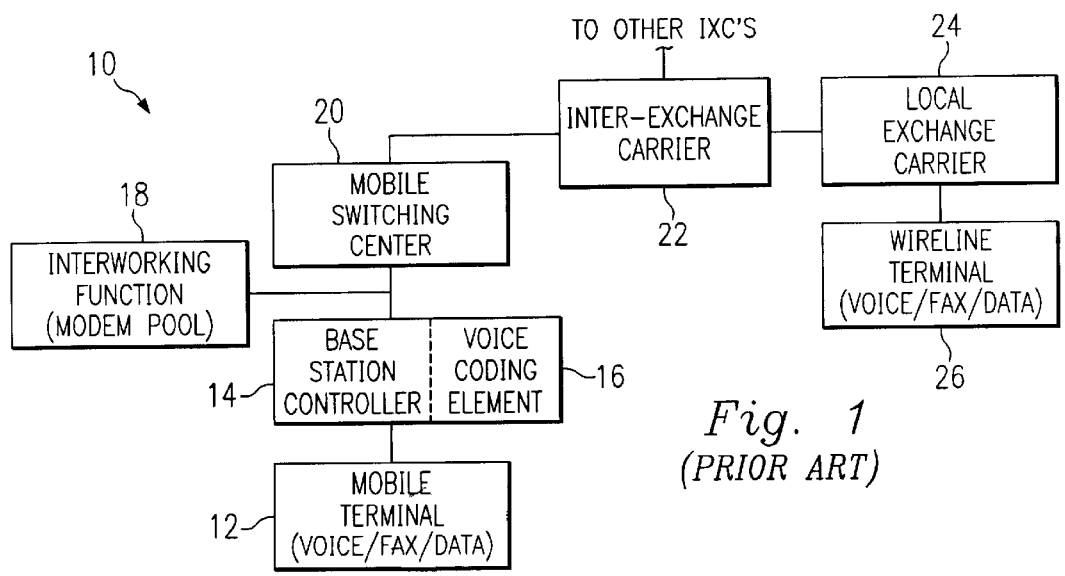
FIG. 1 is a block diagram of a conventional telecommunications network.
Figure 2:
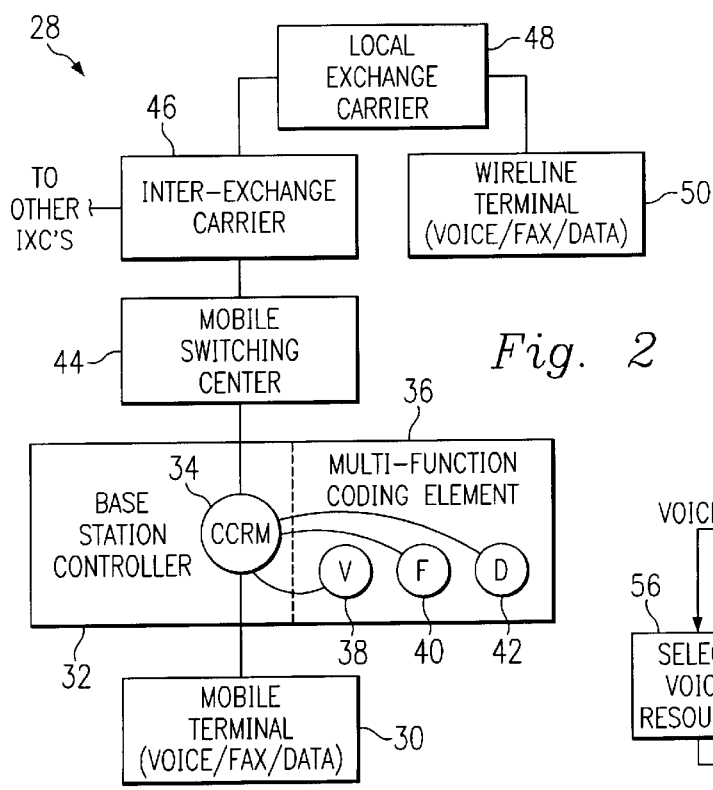
FIG. 2 is a block diagram of a telecommunications network constructed in accordance with the teachings of the present invention and having a multi-function coding element incorporated therein.

Turning now to the drawings, in FIG. 2, the reference numeral 28 denotes a telecommunications network 10 constructed in accordance with the teachings of the present invention and incorporating a multi-function coding element 36 within a base station controller 32 of a base station 31. The telecommunications network 28 includes both wireless and wireline portions. Alternately, the wireless portion may be either a cellular or personal communication service ("PCS") system while the wireline portion may be the PSTN. Of course, the telecommunications network may further include plural wireless systems of the aforementioned or other types as well as additional wireline systems, for example, private networks.

As may now be seen, the base station controller 32 of the base station 31 includes a call control resource manager (or "CCRM") 34 which handles the transfer of voice, fax and data signals between a mobile terminal 30 and an MSC 44. Preferably, the CCRM 34 is a software module which resides within the base station 31 and is executable by the base station controller 32. The base station controller 32 also includes a multi-function coding element 36 which, as will be more fully described below, performs D/A and A/D conversions on voice, fax and data messages received by the base station controller 32. The multi-function coding element 36 may be embodied within a DSP forming part of the base station controller 32. The multi-function coding element 36 includes first, second and third software modules 38, 40 and 42, each of which, like the CCRM 34, preferably reside within the base station 31 and are executable by the DSP or other processor in which the multi-function coding element 36 is embodied. Of course, it is entirely contemplated that the CCRM 34, first software module 38, second software module 40 and third software module 42 may all be stored in a common memory subsystem for the base station controller 31 and be executable by a common processor subsystem for the base station controller 31. The first (or "V") software module 38 contains code necessary to perform D/A and A/D conversions of voice messages. The second (or "F") software module 40 contains code necessary to perform D/A and A/D conversions of facsimile messages. Finally, the third (or "D") software module 42 contains code necessary to perform D/A and A/D conversions of data messages.

The mobile terminal 30 is a multi-function terminal configured to operate in voice, facsimile and data modes. For example, the mobile terminal 30 may include a selector switch which, when set to "voice", will allow an operator of the mobile terminal 30 to conduct a conversation with an operator of a destination terminal. Conversely, when the selector switch is set to "facsimile", the operator is capable of sending a fax to a destination terminal and, when the selector switch is set to "data", the operator is capable of sending E-Mail and other data transfers to a destination terminal. Of course, the use of a multi-mode device as the mobile terminal 30 is purely exemplary and the invention is equally suitable for use in a telecommunications network where wireless mobile or wireline terminals, configured for operation in a single mode, operate as one or more of originating and destination terminals for a connection to be established.

Figure 3:
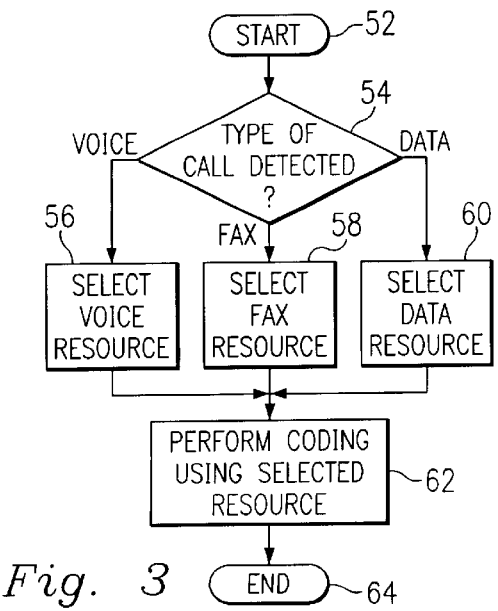
FIG. 3 is a flow chart of a method of coding voice, fax and data signals within a base station controller forming part of the telecommunications network of FIG. 2.

Referring next to FIG. 3, the method of coding an incoming message will now be described in greater detail. The method commences at step 52 and, at step 54, a determination is made as to the type of message incoming to the base station controller 32. When establishing a connection between the mobile terminal 30 and a destination terminal, for example, a multi-mode wireline terminal 50 coupled to MSC 44 by IXC 46 and LEC 48, the mobile terminal 30 first issues a request for connection to the base station controller 34. The initial request will include a variety of information regarding the mobile terminal 30, including the type of message—voice; facsimile or data—to be transmitted thereby. Conversely, if the originating terminal is the wireline terminal 50 and the destination terminal is the mobile terminal 30, the initial request for connection will originate at the LEC 48, from where it will proceed to the IXC 46, the MSC 44 and on to the base station controller 32.

Whether originating at the mobile terminal 20 or the MSC 44, the request for connection is received, within the base station controller 32, by the CCRM module 34. The CCRM module 34 analyzes the received request to determine whether the type of connection requested is for the transfer of voice, facsimile or data messages. If the CCRM module 34 determines that the received request indicates that the message to follow will be a voice message, the method proceeds to step 56 where the CCRM module 34 selects the voice resource 38 to perform either a D/A or an A/D conversion of the received message. If, however, the CCRM module 34 determines at step 54 that the message to follow will be a facsimile message, the method will instead proceed to step 58 where the CCRM module 34 selects the facsimile resource 40 to perform either a D/A or an A/D conversion of the received message. Finally, if the CCRM module 34 determines at step 54 that the message to follow will be a data message, the method will instead proceed to step 60 where the CCRM module 34 selects the data resource 42 to perform either a D/A or an A/D conversion of the received message.

Whether the voice resource 38 is selected at step 56, the facsimile resource 40 is selected at step 58 or the data resource 42 is selected at step 60, the method then proceeds to step 62 where coding is performed using the selected resource. More specifically, if the message is originating at the mobile terminal 30, at step 62, the CCRM module 34 will first receive a digital message from the mobile terminal 30. As previously stated, the digital message may either be a voice, facsimile or data message. If the received digital message is a voice message, at step 62, the voice coding resource 38 converts the received digital data message, typically packets of digital voice data into analog voice message, typically, analog voice tones. Conversely, if the received digital message is a facsimile message, at step 62, the facsimile coding resource 40 converts the received digital facsimile message, typically packets of digital facsimile data, into an analog facsimile message, typically analog facsimile tones. Finally, if the received digital message is a data message, at step 62, the data coding resource 42 converts the received digital data message, typically, a stream of digital data into an analog data message, typically a stream of analog data.

If, however, the message is originating at the wireline terminal 50, at step 62, the CCRM module 34 will first receive an analog message from the MSC 44. As previously stated, the analog message may either be a voice, facsimile or data message. If the received analog message is a voice message, at step 62, the voice coding resource 38 converts the received analog voice message into a digital voice message. Conversely, if the received analog message is a facsimile message, at step 62, the facsimile coding resource 40 converts the received analog facsimile message into a digital facsimile message. Finally, if the received analog message is a data message, at step 62, the data coding resource 42 converts the received analog data message into a digital data message.

The method then ends at step 64 by the CCRM module 34 transferring the converted message to its destination terminal. For example, if the received message was either an analog voice, analog facsimile or analog data message originating at the wireline terminal 50 and received, by the CCRM module 34, from the MSC 44, the converted digital voice, digital facsimile or digital data message would be transferred from the CCRM module 34 to its final destination, the mobile terminal 20. If, on the other hand, the received message was either a digital voice, digital facsimile or digital data message received, by the CCRM module 34, from the mobile terminal 30, the converted analog voice, analog facsimile or analog data would be transferred from the CCRM module 34 to the MSC 44. From there, it would be transferred to its final destination, for example, the wireline terminal 50.

Thus, there has been described and illustrated herein, a telecommunications network characterized by incorporation, within the base station controller thereof, a multi-function coding element capable of performing D/A and A/D conversions for voice, data and facsimile messages. By enabling the operation of voice, facsimile and data coding within a common network element, the present invention more efficiently uses network resources. Furthermore, cost savings will be achieved by the elimination of hardware resources dedicated to data and facsimile transmissions. However, those skilled in the art should recognize that, although illustrative embodiments of the invention have been shown and described, other modifications, changes, and substitutions are intended in the foregoing disclosure. For example, while the disclosed embodiment of the invention discloses combined wireless/wireline systems as the telecommunications network, an MSC and an IXC as switching nodes for the respective wireless and wireline systems, a multi-mode voice/facsimile/data mobile terminal and a multi-mode voice/facsimile/data wireline terminal as the endpoints of the connection, it should be clearly understood that the disclosed embodiment is purely exemplary and that the invention is equally suitable for use in conjunction with other types of telecommunications networks, switching nodes and/or terminals. For example, it is contemplated that the endpoints of the connection may be first and second mobile terminals, each configured to operate is a single mode such as voice. It should be further understood that, for the disclosed embodiment of the invention, that the various components of the telecommunications network 28 have been greatly simplified and that various components thereof have been omitted for ease of illustration. Finally, the foregoing disclosure discloses three message types—voice, facsimile and data—for which coding resources have been dedicated. It is fully contemplated, however, that resources may be dedicated to perform similar conversions for other types of messages. Accordingly, it is appropriate that the appended claims be construed broadly and in a manner consistent with the scope of the invention.

What is claimed is:

1. A base station controller, comprising:
   a call control resource manager, said call control resource manager controlling exchanges of messages between a mobile terminal and a mobile switching center ("MSC") by receiving digital messages from said mobile terminal and transferring analog conversions of said digital messages to said MSC and receiving analog messages from said MSC and transferring digital conversions of said analog messages to said mobile terminal;
   a first coding resource associated with said call control resource manager, said first coding resource performing digital-to-analog ("D/A") and analog-to-digital ("A/D") conversions for messages, received by said call control resource manager, of a first message type; and
   a second coding resource associated with said call control resource manager, said second coding resource performing D/A and A/D conversions for messages, received by said call control resource manager, of a second message type,
      wherein the messages received by the base station controller are thus processed by the call control resource manager, the first and second coding resources regardless of type without involving a coding resource external to the base station controller.

2. The base station controller of claim 1 and further comprising a third coding resource associated with said call control resource manager, said third coding resource performing D/A and A/D conversions for a third message type.

3. The base station controller of claim 2 wherein said first message type is voice, said second message type is facsimile and said third message type is data.

4. The base station controller of claim 1 wherein said first and second coding resources are first and second software modules which reside on a multi-function coding element coupled to said call control resource manager.

5. The base station controller of claim 4 wherein said multi-function coding element is embodied within a digital signal processor ("DSP").

6. The base station controller of claim 1 wherein said call control resource manager further comprises:
   means for receiving digital messages of said first and second types from said at least one mobile terminal;
   means for determining said message type for each received digital message;
   means for calling, for each received digital message, a selected one of said coding resources to perform a D/A conversion thereon; and
   means for transmitting said converted analog messages to said MSC.

7. The base station controller of claim 6 wherein said call control resource manager further comprises:
   means for receiving analog messages of said first and second types from said MSC;
   means for determining said message type for each received analog message;
   means for calling, for each received analog message, a selected one of said coding resources to perform an A/D conversion thereon; and
   means for transmitting said converted digital messages to a selected one of said at least one mobile terminal.

8. A telecommunications network, comprising:
   a first mobile terminal;
   a second mobile terminal;
   a base station controller, said base station controller coupled to said first and second mobile terminals by respective airlinks, said first and second mobile terminals each configured for transmitting digital messages to, and receiving digital messages from, said base station controller in at least one of said voice, facsimile and data modes; and
   an MSC coupled to the base station controller, said MSC configured for transmitting analog messages to, and receiving analog messages from, said base station controller in each of said voice, facsimile and data modes;
   said base station controller including a multi-function coding element for:
      (a) converting digital voice messages into analog voice messages,
      (b) converting analog voice messages into digital voice messages;
      (c) converting digital facsimile messages into analog facsimile messages;
      (d) converting analog facsimile messages into digital facsimile messages;
      (e) converting digital data messages into analog data messages; and
      (f) converting analog data messages into digital data messages;
   said base station controller further including a call control resource manager for:
      (a) controlling exchanges of messages between said first and second mobile terminals and said MSC by receiving digital messages from said first and second mobile terminals and transferring analog conversions of said digital messages to said MSC and receiving analog messages from said MSC and transferring digital conversions of said analog messages to selected ones of said first and second mobile terminals;
      (b) determining whether a received message is a voice message, a facsimile message or a data message; and
      (c) issuing a selected call to said multi-function coding element to convert said received message based upon determining whether said received message is a voice message, a facsimile message or a data message,
         wherein the messages received by the base station controller are thus processed regardless of type within the base station controller without involving an additional coding element external thereto.

9. The telecommunications network of claim 8 wherein said multi-function coding element further comprises:
   a first software module for performing conversions on voice messages;
   a second software module for performing conversions on facsimile messages; and
   a third software module for performing conversions on data messages.

10. The telecommunications network of claim 9 wherein said base station controller further comprises:
- a call control resource module residing on said base station controller, said call control resource module associated with each of said first, second and third software modules and controlling:
  - (a) transmissions of messages between said first mobile terminal and said MSC;
  - (b) transmissions of messages between said second mobile terminal and said MSC; and
  - (C) calls to said first, second and third software to perform conversions on voice, facsimile and data messages.

11. The telecommunications network of claim 10 wherein said first mobile terminal is configured to operate in said voice mode and said second mobile terminal is configured to operate in said facsimile mode.

12. The telecommunications network of claim 10 wherein said first mobile terminal is a multi-function terminal capable of operating in either said voice mode, said facsimile mode or said data mode.

13. For a wireless telecommunications system, a method for transferring a message from a mobile terminal to a mobile switching center ("MSC") via a base station controller, said method comprising the steps of:
- said mobile terminal informing said base station controller of a message type for said message;
- said mobile terminal transferring said message to a call control resource manager residing within said base station controller;
- said call control resource manager selecting, from at least two resources residing within said base station controller, a resource for performing a digital-to-analog ("D/A") conversion of said message received from said mobile terminal;
- said call control resource manager selecting said resource based upon said message type of said received message;
- said selected resource performing said D/A conversion of said received message; and
- said call control resource manager transferring said converted message to said MSC,
  - wherein the messages received by the base station controller are thus processed regardless of type within the base station controller without involving an additional coding element external thereto.

14. The method of claim 13 wherein said at least two resources residing within said base station controller further comprises:
- a first resource for performing D/A conversions on a first type of message;
- a second resource for performing D/A conversions on a second type of message; and
- a third resource for performing D/A conversions on a third type of message;
- wherein said first type of message is a voice message, said second type of message is a facsimile message and said third type of message is a data message.

15. The method of claim 14 wherein the step of said call control resource manager selecting, from at least two resources residing within said base station controller, a resource for performing a digital-to-analog ("D/A") conversion of said message received from said mobile terminal further comprises the steps of:
- said call control resource manager selecting said first resource to perform said D/A conversion of said received message if said received message is a data message;
- said call control resource manager selecting said second resource to perform said D/A conversion of said received message if said received message is a facsimile message; and
- said call control resource manager selecting said third resource to perform said D/A conversion of said received message if said received message is a data message.

16. For a wireless telecommunications system, a method for transferring a message from a mobile switching center ("MSC") to a mobile terminal via a base station controller, said method comprising the steps of:
- said MSC informing said base station controller of a message type for said message;
- said MSC transferring said message to a call control resource manager residing within said base station controller;
- said call control resource manager selecting, from at least two resources residing within said base station controller, a resource for performing an analog-to-digital ("A/D") conversion of said message received from said MSC;
- said call control resource manager selecting said resource based upon said message type of said received message;
- said selected resource performing said A/D conversion of said received message; and
- said call control resource manager transferring said converted message to said mobile terminal,
  - wherein the messages received by the base station controller are thus processed regardless of type within the base station controller without involving an additional coding element external thereto.

17. The method of claim 16 wherein said at least two resources residing within said base station controller further comprises:
- a first resource for performing A/D conversions on a first type of message,
- a second resource for performing A/D conversions on a second type of message; and
- a third resource for performing A/D conversions on a third type of message;
- wherein said first type of message is a voice message, said second type of message is a facsimile message and said third type of message is a data message.

18. The method of claim 17 wherein the step of said call control resource manager selecting, from at least two resources residing within said base station controller, a resource for performing an analog-to-digital ("A/D") conversion of said message received from said MSC further comprises the steps of:
- said call control resource manager selecting said first resource to perform said A/D conversion of said received message if said received message is a data message;
- said call control resource manager selecting said second resource to perform said A/D conversion of said received message if said received message is a facsimile message; and
- said call control resource manager selecting said third resource to perform said A/D conversion of said received message if said received message is a data message.

* * * * *